United States Patent
Käske (10) Patent No.: US 6,579,454 B2
(45) Date of Patent: Jun. 17, 2003

(54) MAGNETIC SEPARATOR

(75) Inventor: Egon Käske, Aachen (DE)

(73) Assignee: Durr Ecoclean GmbH, Filderstadt (DE)

( * ) Notice: Subject to any disclaimer, the term of this patent is extended or adjusted under 35 U.S.C. 154(b) by 90 days.

(21) Appl. No.: 09/780,853

(22) Filed: Feb. 9, 2001

(65) Prior Publication Data

US 2001/0013491 A1 Aug. 16, 2001

(30) Foreign Application Priority Data

Feb. 12, 2000 (DE) .......................... 100 06 262

(51) Int. Cl.[7] .................... B01D 35/06; B03C 1/02; C02F 1/48
(52) U.S. Cl. ................ 210/222; 210/304; 210/313; 210/512.1; 210/512.2; 96/1; 96/2
(58) Field of Search ............... 210/222, 512.1, 210/512.2, 304, 313, 109, 695, 788, 806; 96/1, 2

(56) References Cited

FOREIGN PATENT DOCUMENTS

| DE | 2853694 C2 | 7/1980 |
|---|---|---|
| DE | 4124990 A1 | 1/1993 |
| GB | 2 215 640 A  * | 2/1988 |

OTHER PUBLICATIONS

PTO 2002–4243, which is a translation of the entire disclosure of DE 41 24 990 A1.*

German Search Report (Jul. 2000).

* cited by examiner

Primary Examiner—David A. Reifsnyder
(74) Attorney, Agent, or Firm—Leydig, Voit & Mayer, Ltd.

(57) ABSTRACT

In order to produce a magnetic separator for separating particles from a fluid, comprising a collection chamber through which the fluid is arranged to flow, and a device for producing a magnetic field by means of which the particles are retained in a collector region of the collection chamber during a collection phase, whereby only a very small amount of liquid is lost when the particles retained in the collector region of the collection chamber are removed from the collection chamber after the collection phase, it is proposed that the magnetic separator comprise a sluice chamber having a closable inlet opening through which the particles collected in the collection chamber are transferable into the sluice chamber, and also having a closable extraction opening through which the particles are removable from the sluice chamber.

24 Claims, 9 Drawing Sheets

MAGNETIC SEPARATOR

The present invention relates to a magnetic separator for separating particles from a fluid, comprising a collection chamber through which the fluid is arranged to flow, and a device for producing a magnetic field by means of which the particles are retained in a collector region of the collection chamber during a collection phase.

Such magnetic separators are known from the state of the art.

In the case of magnetic separators of the type mentioned hereinabove, the particles retained in the collector region of the collection chamber during the collection phase are discharged from the collection chamber during a discharge phase by flushing a fluid through the collection chamber in the reverse direction. It is disadvantageous hereby, that the considerable amount of fluid used for expelling the particles from the collection chamber is discharged, together with the particles that are to be separated, from the magnetic separator and is therefore lost.

Consequently the object of the present invention is to provide a magnetic separator of the type mentioned hereinabove wherein only a small quantity of fluid is lost when the particles that were retained in the collector region of the collection chamber are removed from the collection chamber after the collection phase.

In accordance with the invention, this object is achieved in the case of a magnetic separator having the features mentioned in the first part of claim 1 in that the magnetic separator comprises a sluice chamber having a closable inlet opening through which the particles collected in the collection chamber are transferable into the sluice chamber, and also having a closable extraction opening through which the particles are removable from the sluice chamber.

The advantage offered by the concept in accordance with the invention, is that the quantity of fluid, which is discharged together with the particles, is restricted to the volume remaining in the sluice chamber after the transfer of the particles that were collected in the collection chamber into the sluice chamber. This residual volume can be kept very small, firstly by appropriate selection of the size of the sluice chamber and secondly by appropriate selection of the quantity of particles retained in the collector region of the collection chamber during the collection phase. Moreover, due to the presence of the sluice chamber, it is possible to transfer the particles that were collected in the collection chamber out of the collector region into the interior of the sluice chamber without first having to drain the fluid requiring cleaning from the collection chamber.

The magnetic separator in accordance with the invention is particularly suitable for stripping ferrite particles from fluids, such as washings, cooling lubricants or oils, for example.

However the magnetic separator may also be used for separating ferrite particles from streams of gas and especially from air streams, for example, for cleaning the exhaust air from an abrasion dust extraction plant.

Furthermore, it has been established experimentally that non-ferrite particles, especially very fine aluminium particles, are also separable from a fluid by means of the magnetic separator in accordance with the invention.

The magnetic separator in accordance with the invention may be employed as a main stream magnetic separator in a circulating fluid system, for example in a scouring, cooling lubricant, or oil circulation system.

As an alternative thereto, it is also possible to employ the magnetic separator in a bypass line, for example, for bath maintenance purposes in washing baths or cooling lubricant plants.

The magnetic separator in accordance with the invention is easily integratable into fluid lines and reliably prevents the storage and/or operational containers in a fluid circulating system from silting up.

In a preferred embodiment of the magnetic separator, the sluice chamber is disposed below the collection chamber. This thereby ensures that the particles that are retained in the collector region of the collection chamber will fall into the sluice chamber under the effect of gravity after the magnetic field has been switched off or removed.

In principle, the sluice chamber could have any shape, cylindrical for example.

However, it is preferred to have a sluice chamber which tapers, preferably conically, towards the extraction opening.

In order to enable the sluice chamber to be easily emptied, the extraction opening is preferably disposed at the lower end of the sluice chamber so that the particles will fall out of the sluice chamber and into a collection container disposed therebelow due to the effect of gravity after the extraction opening has been opened.

Furthermore, for the purposes of completely emptying the sluice chamber, it is expedient for the extraction opening to extend over the entire base of the sluice chamber.

Furthermore, complete emptying of the sluice chamber can be assisted by providing the inner surface of the wall of the sluice chamber at least partially with a non-stick coating, preferably with a non-stick coating of polytetrafluoroethylene.

In principle, any form of closure device could be used for closing the inlet opening of the sluice chamber.

In a preferred embodiment of the magnetic separator, provision is made for the inlet opening to be closable by means of a pivotal flap.

In principle, any form of closure device could also be used for closing the extraction opening of the sluice chamber.

In a preferred embodiment of the magnetic separator, provision is made for the extraction opening to be closable by means of a slider.

As already mentioned, the maximum volume of fluid, which is discharged by the sluice chamber together with the particles, corresponds to the difference between the volume of the interior of the sluice chamber and the volume of the particles transferred into the sluice chamber.

In order to keep the volume of the fluid that is discharged together with the particles as small as possible, it is therefore of advantage if the volume of the interior of the sluice chamber substantially corresponds to the volume of particles collected in the collection chamber during the collection phase.

In principle, the fluid could flow through the collection chamber in any arbitrary direction, particularly in any horizontal or vertical direction.

In a preferred embodiment of the magnetic separator, provision is made for the fluid to flow from top to bottom through the collection chamber. It is thereby ensured that the inflow of the fluid into the collection chamber will be arranged above the collector region so that the particles will not be able to fall from the collector region into the fluid inlet feed.

It is expedient if the magnetic separator comprises guide means for producing a substantially helical flow through the collection chamber. Due to the helical flow, there thus arises a so-called cyclone effect, i.e. the particles being separated, which generally have a greater density than the fluid, will be accelerated towards the (relative to the helical axis of the helical stream) radially outwardly located boundary walls of the collection chamber by the centrifugal forces effective thereon. Thus, by virtue of the cyclone effect, separation of the particles that are to be separated from the fluid will commence immediately, and the particles requiring separation then only need to be retained on said radially outward boundary walls.

In this case, it is particularly expedient for the device for producing the magnetic field to be arranged close to the radially outer boundary walls of the collection chamber and for it to produce a magnetic field by means of which the particles will be retained on the radially outer boundary walls of the collection chamber.

The magnetic separator is particularly easy to manufacture and arrange in space-saving manner if the collection chamber has a substantially cylindrical shape.

For the purposes of producing the cyclone effect which has already been described hereinabove, it is advantageous if the collection chamber has an inlet feed through which the fluid flows into the collection chamber substantially tangentially relative to the inner surface of the wall of the collection chamber.

If, advantageously, the magnetic separator comprises a return feed which flows into an aperture opening in the collection chamber and extends upwardly from the aperture opening, then the effect will thereby be achieved that the particles or other objects sinking into the collection chamber cannot settle in the return feed.

It is particularly expedient if a central axis of the return feed in the vicinity of the aperture opening includes an angle of at least approximately 30° with the horizontal. Such a return feed is steep enough to reliably prevents particles or other objects from settling in the return feed.

The device for producing the magnetic field may, for example, comprise electromagnets which can be turned off after the collection phase so as to enable the particles to be transferred into the sluice chamber. However, such electromagnets may exhibit remanence, i.e. a residual magnetic field which continues to exist after the current through the coil has been switched off, thereby possibly hindering the complete removal of the particles from the collector region.

In a preferred embodiment of the separator in accordance with the invention, provision is therefore made for the device for producing the magnetic field to comprise at least one permanent magnet element.

In order to enable the particles to be transferred from the collector region into the sluice chamber after the collection phase, provision is advantageously made for the device for producing the magnetic field to comprise at least one magnet element which is movable relative to the collection chamber.

One particularly simple method of implementing this feature is obtained when the magnet element is made pivotal relative to the collection chamber.

Furthermore, it is advantageous if the magnet element is disposed on a mounting element of ferromagnetic material. By virtue of the magnetic influence of the ferromagnetic material in the mounting element, the magnetic field produced by the magnet element will be strengthened and the extent thereof within the collection chamber will be increased. This thereby enables very fine particles as well as particles consisting of a high density ferrite material to be retained securely in the collector region.

In a preferred embodiment of the magnetic separator in accordance with the invention, provision is made for the magnetic separator to comprise a receptacle for an air-cushion, said receptacle communicating with the collector region of the collection chamber. This air-cushion is primed to the pressure of the fluid during the collection phase in which the collection chamber is traversed by the fluid requiring cleaning. Since the fluid is advanced through the collection chamber by means of a fluid pump during the collection phase, the pressure of the fluid during the collection phase is higher than atmospheric pressure. If the flow of fluid into the collection chamber is blocked at the end of the collection phase, then the air-cushion will expand thereby triggering a pulse-like movement of the fluid column in the collector region of the collection chamber thus causing the particles which have collected in the collector region to be detached.

For the purposes of creating this detachment effect produced by the expanding air-cushion, it is particularly expedient if the air cushion is disposed above the collector region so that the detached particles will move downwardly under gravitational force in the same sense as the pulse-like movement triggered by the expansion of the air cushion.

In a preferred embodiment of the magnetic separator in accordance with the invention, the receptacle for the air cushion comprises a substantially cylindrical accommodating tube.

It is particularly expedient if the longitudinal axis of the accommodating tube is aligned towards the collector region so that the casing wall of the accommodating tube will steer the pulse-like movement triggered by the expansion of the air-cushion towards the collector region.

If the magnetic separator only comprises one single collection chamber, then the stream of fluid through the magnetic separator must be interrupted between two collection phases for the purposes of transferring the particles collected in the collector region into the sluice chamber (sedimentation phase).

A continuous separating process can be effected in the magnetic separator if, advantageously, the magnetic separator comprises at least two collection chambers through which the fluid is arranged to flow alternately. Thus, at any one time, one of the collection chambers is in its collection phase, whilst the other collection chamber is in its sedimentation phase wherein the particles are transferred from the collector region into the sluice chamber.

In principle, it is possible for the two collection chambers to be housed in mutually spatially separated magnetic separator units. This has the advantage that these magnetic separator units can either be used individually for a discontinuous separating process, or, they can be connected together for effecting a continuous separating process and thus the utilisation thereof is very flexible.

By contrast however, a magnetic separator for a continuous separating process is particularly space-saving if the at least two collection chambers are arranged in a common housing.

Such a magnetic separator is particularly easy to manufacture and arrange in space-saving manner if, advantageously, provision is made for the common housing to comprise a substantially cylindrical section.

Further features and advantages of the invention form the subject matter of the following description and diagrammatic illustration of embodiments thereof.

In the drawings.

Similar or functionally equivalent elements are referenced with the same reference symbols in each of the Figures.

A first embodiment of a magnetic separator bearing the general reference 100 in FIGS. 1 to 7 comprises a magnetic separator unit 102 having a substantially cylindrical, hollow base body 104 whose longitudinal axis 105 is aligned vertically during the operation of the magnetic separator 100.

At its upper end, the base body 104 comprises a flange 106 to which an inspection cover 110, which closes the upper end of the base body 104, is fixed by means of fastening screws 108.

Figure 4:
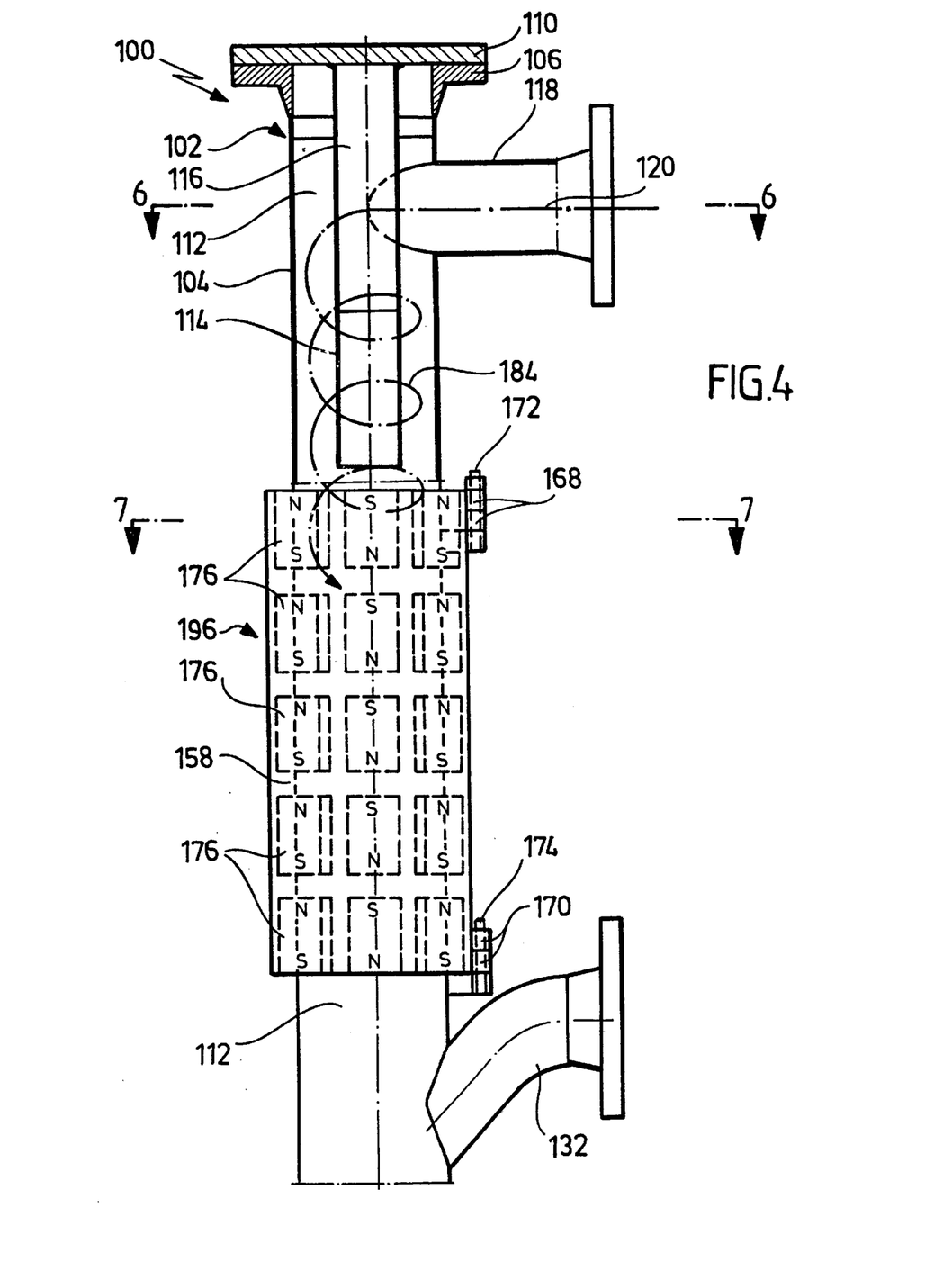
FIG. 4 a vertical longitudinal section through an upper region of the magnetic separator of FIGS. 1 to 3.
Figure 5:
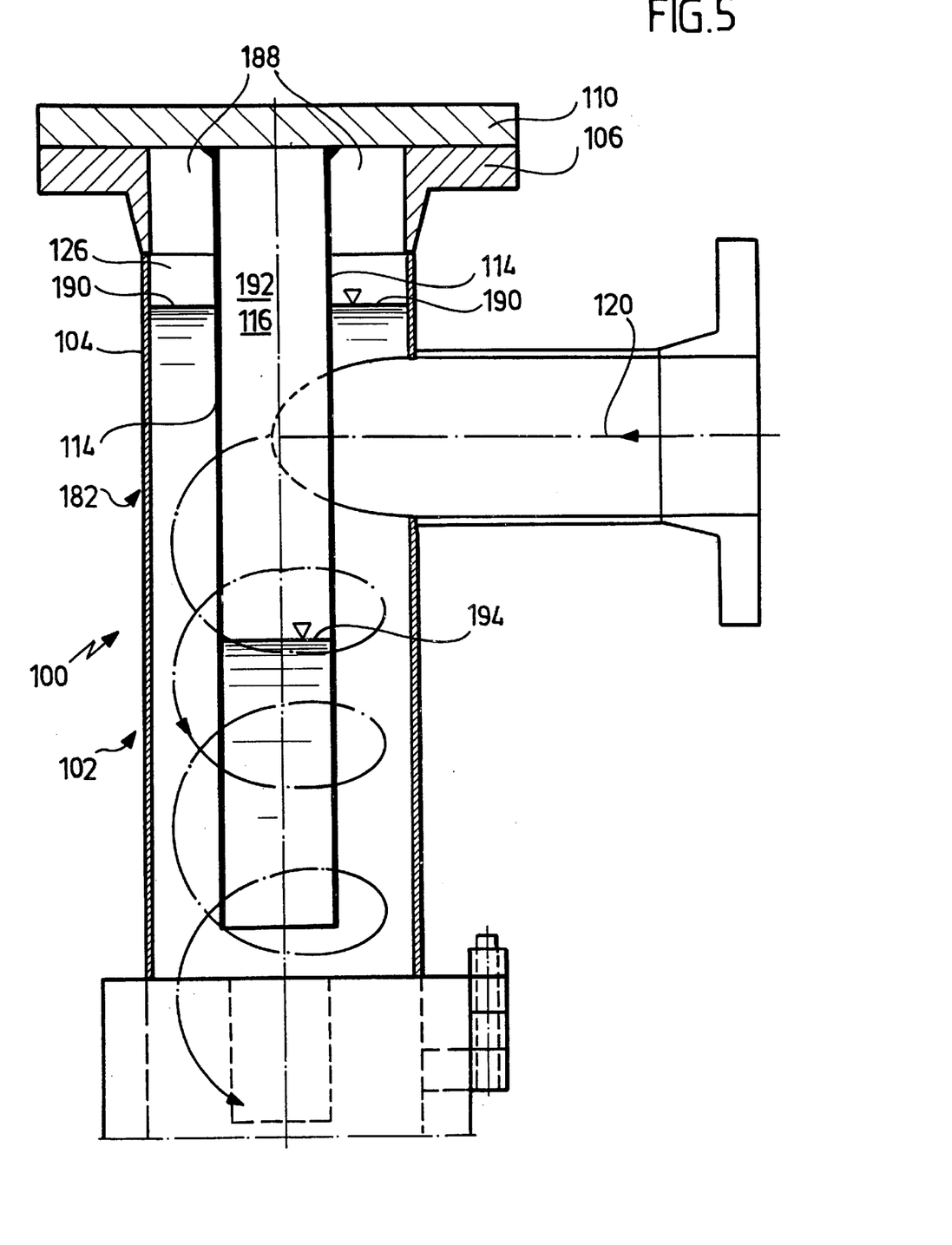
FIG. 5 an enlarged illustration of the upper region of FIG. 4.

As can best be appreciated from FIGS. 4 and 5, an inner tube 114 of circular cross-section is arranged in the upper region of the interior 112 of the base body 104, said inner tube being aligned co-axially relative to the cylindrical base body 104 and being fixed at its upper end to the lower face of the inspection cover 110, by welding for example.

The lower end of the inner tube 114 is open so that the interior 116 of the inner tube 114 flows into the interior 112 of the cylindrical base body 104.

Furthermore, an inlet feed connection piece 118, whose central axis 120 is aligned horizontally, flows into the upper region of the interior 112 of the cylindrical base body 104 through the casing wall of the cylindrical base body 104 (see FIGS. 4 and 5).

Figure 6:
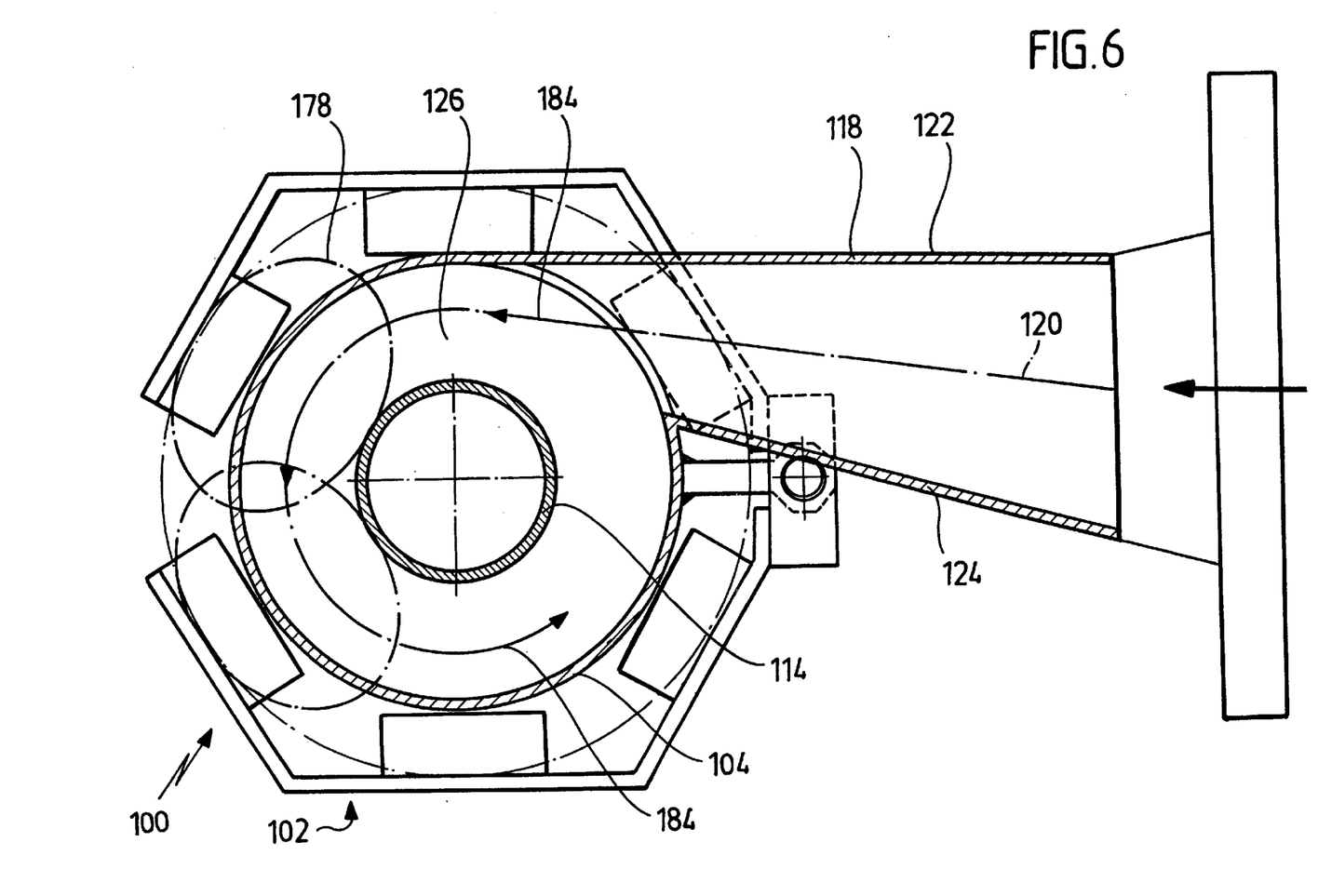
FIG. 6 a horizontal cross-section through the magnetic separator of FIGS. 1 to 5 along the line 6—6 in FIG. 4.

As can be appreciated from the horizontal cross-section of FIG. 6, an outer side wall 122 of the inlet feed connection piece 118 extends tangentially relative to the casing wall of the cylindrical base body 104, whilst an inner side wall 124 of the inlet feed connection piece 118 extends substantially tangentially to the casing wall of the inner tube 114 and includes an angle of approximately 20 degrees with the outer side wall 122.

The inlet feed connection piece 118 thus tapers from the end thereof remote from the cylindrical base body 104 towards the end thereof facing the base body 104 in such a manner that the cross-sectional area of the inlet feed connection piece 118 decreases continuously in a direction perpendicular to its central axis 120 from the end thereof remote from the base body 104 towards the end thereof facing the base body 104.

The central axis 120 of the inlet feed connection piece 118 extends into the intermediary space 126 between the casing wall of the cylindrical base body 104 on the one hand and the casing wall of the inner tube 114 on the other.

Figure 1:
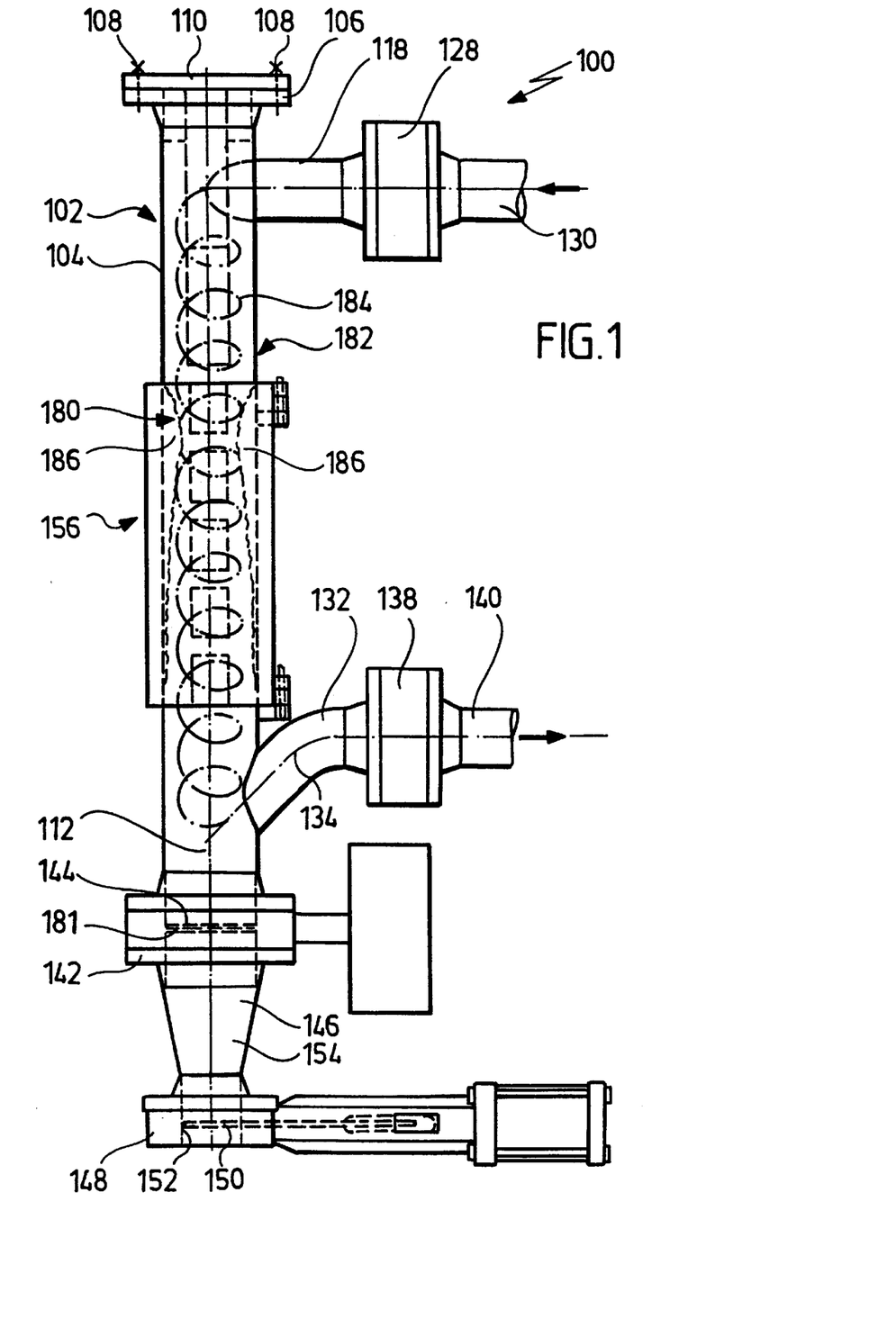
FIG. 1 shows a vertical longitudinal section through a first embodiment of a magnetic separator during a collection phase.
Figure 2:
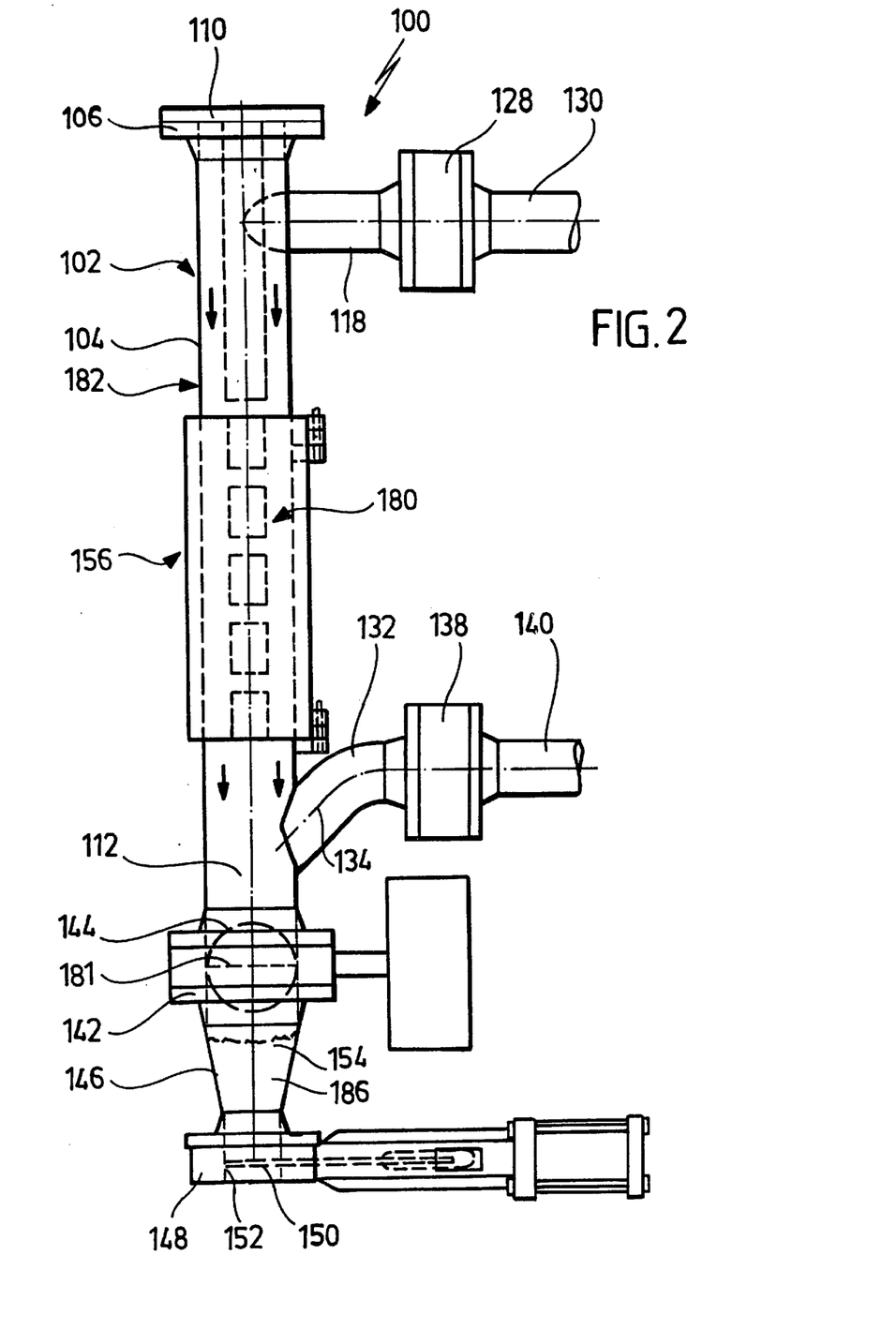
FIG. 2 a vertical longitudinal section through the magnetic separator of FIG. 1 in a sedimentation phase.

As can best be appreciated from FIG. 1, an inlet feed valve 128 is flanged to the end of the inlet feed connection piece 118 remote from the base body 104, the output of said valve being joined to the inlet feed connection piece 118 and the input side thereof being connected to the inlet feed line 130.

As can also be appreciated from FIG. 1, a return feed connection piece 132, which is in the form of a curved bent tube, flows into the lower region of the interior 112 of the cylindrical base body 104, whereby the central axis 134 of the return feed connection piece 132 at the base body end thereof intersects the longitudinal axis 105 of the base body 104 at an angle of approximately 45 degrees, whereas the central axis 134 of the return feed connection piece 132 at the end thereof remote from the base body 104 is aligned substantially horizontally.

A return feed valve 138 is flanged to the end of the return feed connection piece 132 remote from the base body 104, the input of said valve being joined to the return feed connection piece 132 and the output side thereof being connected to a return feed line 140.

As can further be appreciated from FIG. 1, a flap valve 142 is flanged to the lower end of the cylindrical base body 104, said valve comprising a substantially circular valve flap 144 (see especially FIG. 2) which is pivotal from a closed position (illustrated in FIG. 1), in which the valve flap 144 is aligned horizontally and seals the lower end of the interior 112 of the cylindrical base body 104, into an open position (illustrated in FIG. 2) in which the valve flap 144 is aligned substantially vertically and opens the passage through the lower end of the interior 112 of the cylindrical base body 104.

To the lower face of the flap valve 142 there is flanged a sluice chamber 146 which is substantially in the form of a section of a cone, is aligned co-axially relative to the longitudinal axis 105 of the cylindrical base body 104 and tapers towards the end thereof remote from the base body 104.

The inner surface of the wall of the sluice chamber 146 is provided with a non-stick coating, for example of polytetrafluoroethylene.

To the lower end of the sluice chamber 146 there is flanged a slide valve 148, for example a slit-seat blocking valve, such as is described in DE 41 18 105 A1 or U.S. Pat. No. 5,082,247 to which reference should be made in regard to the construction of such a valve, said valve comprising a valve slider 150 which seals an extraction opening 152 of the sluice chamber 146 in the closed position of the slide valve 148 illustrated in FIG. 1, and opens the extraction opening 152 in the open position of the slide valve 148 illustrated in FIG. 3, so that the interior 154 of the sluice chamber 106 will be connected to the exterior of the magnetic separator unit 102 in the open position of the slide valve 148.

The valve slider 150 is displaceable in a horizontal direction between the closed position thereof and the open position thereof.

Furthermore, the magnetic separator unit 102 comprises a magnet unit 156 which surrounds the cylindrical base body 104 in the region between the inlet feed connection piece 118 and the return feed connection piece 132.

Figure 7:
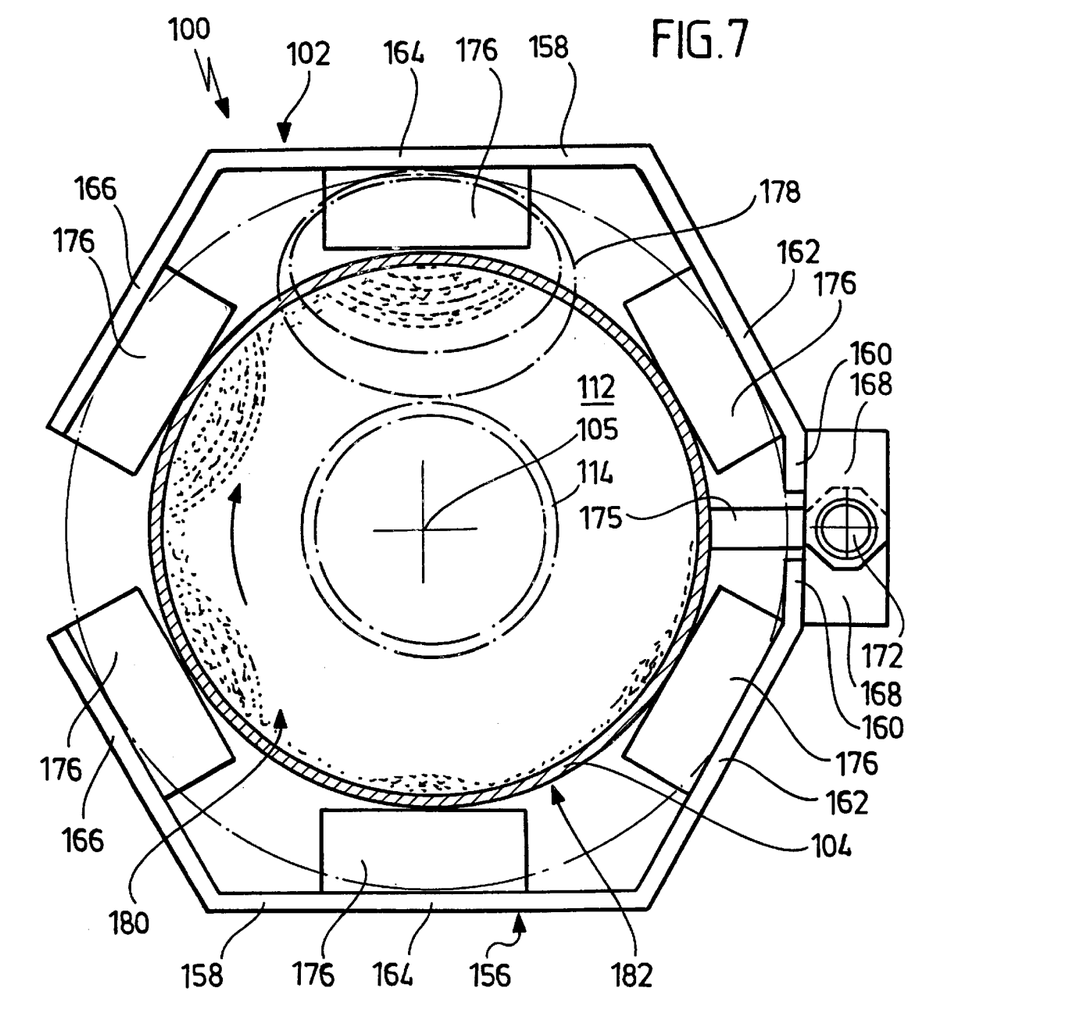
FIG. 7 a horizontal cross-section through the magnetic separator of FIGS. 1 to 6 along the line 7—7 in FIG. 4.

As can best be appreciated from FIGS. 4 and 7, the magnet unit 156 comprises two mounting plates 158 which extend in parallel to the longitudinal axis 105 of the cylindrical base body 104, each said plate comprising four legs 160, 162, 164 and 166 whereby each leg includes an angle of approximately 120 degrees with the respective neighbouring legs.

The respective shortest leg 160 on each mounting plate 158 is fixed respectively to an upper hinge body 168 or to a lower hinge body 170 (see FIG. 4), said bodies, for their part, being pivotal about a respective hinge pin 172 and 174.

Each of the hinge pins 172, 174 is fixed to the outer surface of the casing wall of the base body 104 via a web 175 (see FIG. 7), by welding for example.

Five substantially rectangular solid magnet elements 176 are mounted on those respective inner surfaces of the remaining legs 162, 164 and 166 of each of the mounting plates 158 which face the cylindrical base body 104, whereby the magnet elements 176 mounted on the same leg of the same mounting plate are arranged vertically one above the other so that, in each case, a row of magnet elements 176 is arranged on each of the legs 162, 164, 166 of the mounting plates 158 and is aligned in parallel with the longitudinal axis 105 of the cylindrical base body 104, whereby the respective complementary poles of the successive magnet elements 176 within a same row face one another.

Thus, within a same of row, the north poles of each of the magnet elements 176 either all point upwardly or they all point downwardly (see FIG. 4). On the other hand however, in the peripheral direction of the magnet unit 176, the orientation of the magnetic poles of the magnet elements 176 in successive vertical rows are mutually opposed. Thus, a row, in which the north poles of the magnet elements 176 point upwardly, is always adjoined by another vertical row in which the north poles of the magnet elements 176 point downwardly.

Hereby, the magnet elements 176 could be permanent magnets or electromagnets.

Together, the magnet elements 176 create a strong magnetic field in the region between the mounting plates 158.

The strength of each magnetic field is increased due to the mounting plates 158 themselves being made of a ferromagnetic material, for example, a ferromagnetic steel, and hence the strength of the magnetic field of the magnet elements 176 is increased by magnetic influence.

By contrast however, the cylindrical base body 104 is made of a non-magnetic material, for example, from V2A steel, from V4A steel, from aluminium or a synthetic material.

Consequently, in the collection position of the magnet unit 156 illustrated in FIGS. 4 and 7 in which the magnet elements 176 of the magnet unit 106 adjoin the casing wall of the base body 104 at the exterior thereof, the magnetic field produced by the magnet elements 176 penetrates deeply into the interior 112 of the cylindrical base body 104 as is indicated by the field lines 178 in FIG. 7, so that the ferrite particles in the interior 112 of the base body 104 are drawn towards the inner surface of the casing wall of the cylindrical base body 104 and are retained there when the magnet unit 156 is located in the collection position illustrated in FIG. 7.

The attractive force holding the ferrite particles onto the inner surface of the casing wall of the base body 104 disappears however when the magnet elements 176 are moved into a (not illustrated) removal position by pivoting the mounting plates 158 about the hinge pins 172, 174 away from the casing wall of the base body 104.

The region of the interior 112 of the cylindrical base body 104 surrounded by the mounting plates 158 and the magnet elements 176 arranged thereon in the collection position of the magnet unit 156 is referred to hereinafter as the collector region 180 of the magnetic separator unit 102, whereas the region of the magnetic separator unit 102 extending from the inspection cover 110 to the inlet opening 181 of the sluice chamber 146 closable by means of the flap valve 142 is referred to as the collection chamber 118.

The previously described magnetic separator 100 functions as follows:

In a collection phase of the magnetic separator 100, the inlet feed valve 128 and the return feed valve 138 are open whereas the flap valve 142 is closed. The slide valve 148, which seals the extraction opening 152 of the sluice chamber 146, may be opened or closed in the collection phase.

In the collection phase, the magnet unit 156 of the magnetic separator 100 is in the collection position, that it is to say, the magnet elements 176 rest on the outer surface of the casing wall of the base body 104 so that a strong magnetic field prevails in the collector region 180 which draws the ferrite particles towards the inner surface of the casing wall of the base body 104.

A fluid loaded with the ferrite particles requiring separation is supplied to the magnetic separator 100 through the inlet feed line 130 by means of a (not illustrated) fluid pump at an excess pressure of 0.5 bar for example.

The fluid requiring cleaning may be a liquid such as washings, a cooling lubricant or an oil for example.

The fluid requiring cleaning could also be a gas or a mixture of gases such as the exhaust gas from an abrasion dust extraction plant for example.

The fluid entering the collection chamber 182 through the open inlet feed valve 128 and the inlet feed connection piece 118 is set into helical motion by being forced against the inner surface of the casing wall of the base body 104 on the one hand, and against the outer surface of the inner tube 114 on the other, said motion being composed of a rotational movement about the vertical longitudinal axis 105 of the base body 104 and a downwardly directed axial movement along the longitudinal axis 105. A flow line serving to illustrate this helical movement is depicted in FIGS. 1 and 6.

The fluid being cleaned flows downwardly through the collection chamber 182 in the previously described manner and then through the return feed connection piece 132 and the open return feed valve 138 back into the return feed line 140. The slope of the end region of the return feed connection piece 132 at the collection chamber side thereof prevents particles or other objects from settling in the return feed connection piece 132.

The helical flow of the fluid through the collection chamber 182 creates a cyclone effect, that is to say, the ferrite particles requiring separation, which have a higher density than the fluid, are accelerated towards the inner surface of the casing wall of the base body 104 by virtue of the centrifugal forces effective thereon.

In the collector region 180 of the collection chamber 182 in which the magnetic field of the magnetic elements 176 is effective, the ferrite particles are held on the inner surface of the casing wall and form a particle slurry 186 there (see FIG. 1).

Two air cushions are present in the upper region of the collection chamber 182 during the operation of the magnetic separator 100. A first air cushion 188 is formed above the level 190 of the fluid in the intermediary space 126 between the casing wall of the base body 104 and the inner tube 114 (see FIG. 5).

A second air cushion 192 is formed above the level 194 of the fluid in the interior 116 of the inner tube 114 (see FIG. 5).

During the collection phase, the two air cushions 188, 192 are subject to the excess pressure prevailing in the system which is applied to the fluid by the fluid feed pump.

The collection phase of the magnetic separator 100 comes to an end when the volume of the particle slurry 186 that has collected in the collector region 180 of the magnetic separator 100 virtually corresponds to the volume of the interior 154 of the sluice chamber 146.

Insofar as it was open during the collection phase, the slide valve 148 is then closed for the subsequent sedimentation phase of the magnetic separator 100.

Thereafter, the return feed valve 138 and then the inlet flow valve 128 are closed.

The magnet unit 156 of the magnetic separator unit 102 is then moved from the collection position into the removal position whereby the mounting plates 158 are pivoted away from the casing wall of the cylindrical base body 104. The particles collected in the collector region 180 are then no longer retained on the inner surface of the casing wall of the base body 104.

Following this, the flap valve 142 is opened. Since the sluice chamber 146 was at atmospheric pressure and thus at a lower pressure than the collection chamber 182 prior to the opening of the flap valve 142, the two air cushions 188 and 192 will expand with the opening of the flap valve 142, this thus triggering a pulse-like movement in the column of fluid disposed below the air cushions, said movement being extended from top to bottom through the collection chamber 182. As a result of this pulse-like movement, substantially all of the ferrite particles will be detached completely from the inner surface of the casing wall of the base body 104 in the collector region 180. The detached particles sink downwardly under the effect of gravity through the collection chamber 182 and thereby enter the sluice chamber 146 through the open inlet opening 181.

The sedimentation phase of the magnetic separator 100 is brought to an end by closing the flap valve 142 as soon as substantially all of the particle slurry 186 has entered the interior of the sluice chamber 146 from the collector region 180, namely, by pivoting the valve flap 144 from the open position into the closed position.

For the subsequent discharge phase, a particle slurry collection container 196 is positioned under the extraction opening 152 of the sluice chamber 146, and then the extraction opening 152 is freed by opening the slide valve 148, namely, by displacing the valve slider 150 from the closed position into the open position.

Figure 3:
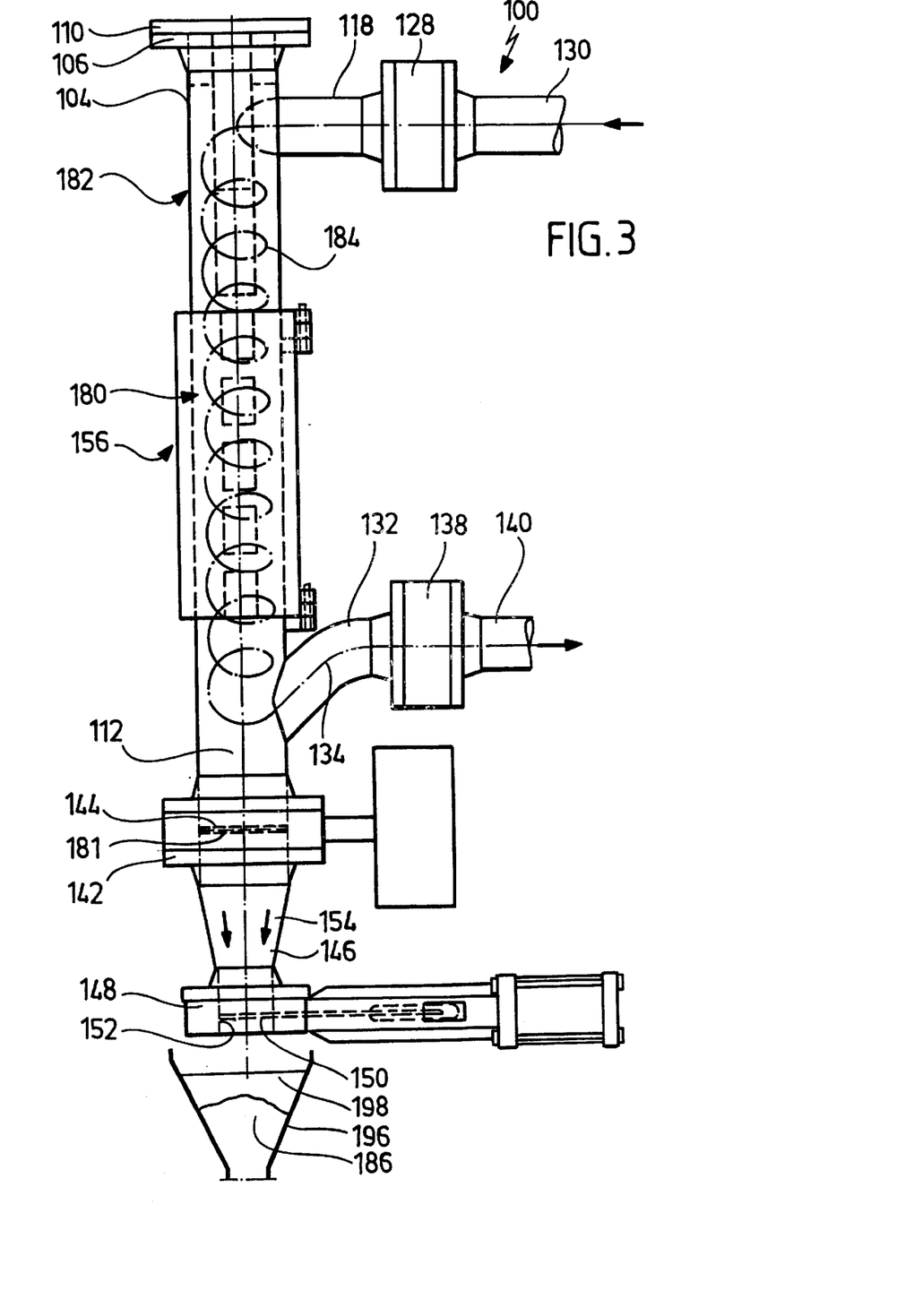
FIG. 3 a vertical longitudinal section through the magnetic separator of FIGS. 1 and 2 in a discharge phase.

The particle slurry 186 thereupon falls out of the sluice chamber 146 through the extraction opening 152 into the particle slurry collection container 196 under the effect of gravity (see FIG. 3).

Complete emptying of the sluice chamber 146 is hereby ensured by virtue of the non-stick coating on the inner surface of the sluice chamber wall.

Since the volume of the particle slurry 186 is only slightly less than the volume of the interior 154 of the sluice chamber 146, the volume of the quantity of fluid 198 which remains in the sluice chamber 146 following the closure of the flap valve 142 and which is subsequently discharged together with the particle slurry 186 into the particle slurry collection container 196 is also very small.

The particle slurry 186 caught in the particle slurry collection container 196 and the quantity of fluid 198 discharged therewith are then supplied to a waste disposal or reutilisation plant.

A new collection phase may be begun in the collection chamber 182 even as the particle slurry 186 is still being extracted from the sluice chamber 146.

To this end, the magnet unit 156 is moved from the removal position back into the collection position by pivoting the mounting plates 158 together until the magnet elements 176 rest on the outer surface of the casing wall of the cylindrical base body 104.

Thereafter, the return feed valve 138 and the inlet feed valve 128 are opened, whereby a flow of fluid is produced through the collection chamber 182 so that the ferrite particles contained in the fluid will once again be retained in the collector region 180.

Furthermore, due to the opening of the inlet feed valve 128, the fluid column in the collection chamber 182 is again subjected to the excess pressure in the system whereby the two air cushions 188 and 192 will be primed afresh so that a new operational cycle of the magnetic separator 100 can begin.

Once in this primed state, the average volumes of the air cushions 188, 192 will remain substantially constant during the operation of the magnetic separator 100 since an equilibrium is set up between the quantity of air which leaks out from the air cushions during the sedimentation phase and the quantity of air which is supplied to the air cushions 188, 192 by the air bubbles contained in the fluid flowing through the collection chamber 182.

In principle, the magnetic separator 100 could be operated manually by actuating the inlet feed valve 128, the return feed valve 138, the flap valve 142 and the slide valve 148 by hand.

Moreover, the magnet unit 156 could be pivoted manually from the collection position into the removal position and back again.

However, as an alternative thereto, it is also possible for the magnetic separator 100 to be operated fully automatically.

To this end, the aforementioned valves are in the form of electromagnetically or electric motor actuatable valves and they are connected to a (not illustrated) control unit which actuates these valves in the manner described hereinabove.

Furthermore, the magnet unit 156 of the magnetic separator unit 102 is in this case provided with a magnetically, pneumatically or hydraulically driven moving device by means of which the mounting plates 158 are pivoted, said device also being controlled by the control unit.

The particle slurry 186 removed from the sluice chamber 146 may be transported away by means of an automatic conveyor device.

Figure 8:
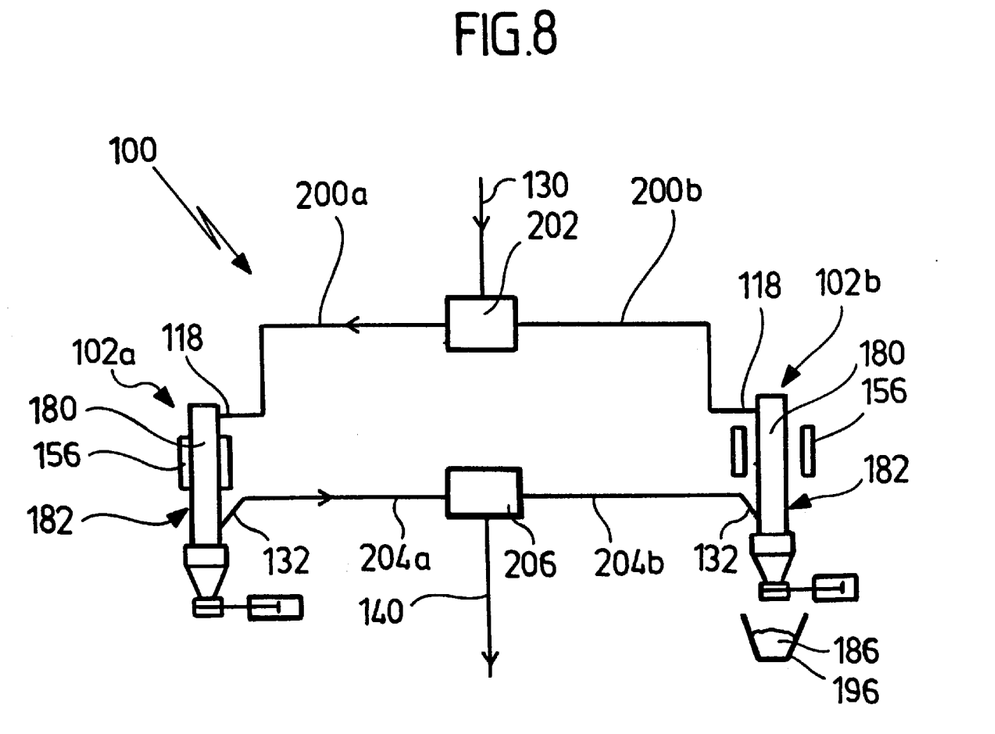
FIG. 8 a schematic illustration of a second embodiment of a magnetic separator which comprises two collection chambers arranged in separate housings.

A second embodiment of a magnetic separator 100 illustrated in FIG. 8 differs from the first embodiment described above in that the magnetic separator 100 of the second embodiment comprises two magnetic separator units 102a, 102b each having a respective collection chamber 182, so that the collection chambers 182 can be alternately flushed through with the fluid being cleaned thereby making it possible for a continuous separation process to be effected in the magnetic separator 100.

As can be appreciated from FIG. 8, the inlet feed connection piece 118 of the first magnetic separator unit 102a in the second embodiment of the magnetic separator 100, which is otherwise constructed in exactly the same manner as the magnetic separator unit 102 of the first embodiment, is connected to a first output of a three-way inlet feed valve 202 via a first sub inlet feed line 200a.

A second output of the three-way inlet feed valve 202 is connected via a second sub inlet feed line 200b to the inlet feed connection piece 118 of the second magnetic separator unit 102b.

The input of the three-way inlet feed valve 202 is connected to the inlet feed line 130.

Furthermore, the return feed connection piece 132 of the first magnetic separator unit 102a is connected via a first sub return feed line 204a to a first input of a three-way return flow valve 206.

A second input of the three-way return feed valve 206 is connected via a second sub return flow line 204b to the return feed connection piece 132 of the second magnetic separator unit 102b.

The return feed line 140 is connected to the output of the three-way return feed valve 206.

The previously described second embodiment of a magnetic separator 100 functions as follows:

In a first operational phase (illustrated in FIG. 8), the three-way inlet feed valve 202 is in a position in which the first sub inlet flow line 200a is connected to the inlet feed line 130 but access to the second sub inlet feed line 200b is blocked.

Furthermore, in this first operational phase, the three-way return feed valve 206 is in a position in which the first sub return feed line 204a is connected to the return feed line 140 but access from the second sub return feed line 204b into the return feed line 140 is blocked.

Furthermore, the magnet unit 156 of the first magnetic separator unit 102a is in its collection position, whereas the magnet unit 156 of the second magnetic separator unit 102b is in its removal position.

Consequently, in the first operational phase, the fluid requiring cleaning flows through the collection chamber 182 of the first magnetic separator unit 102a, whereby the ferrite particles conveyed thereby are retained in the collector region 180 of the collection chamber 182 in the first magnetic separator unit 102a. The first magnetic separator unit 102a is thus in its collection phase.

Meanwhile, the second magnetic separator unit 102b is in its sedimentation phase in which the particle slurry 186 collected in the collector region 180 is initially transferred into the sluice chamber 146 whereafter the sluice chamber 146 is emptied into a particle slurry collection container 196.

Once a quantity of particle slurry whose volume virtually corresponds to the volume of the sluice chamber 146 has collected in the collector region 180 of the first magnetic separator unit 102a, then the magnetic separator 100 is switched from the first operational phase into a second operational phase in which the three-way inlet feed valve 202 is moved into a position in which the second sub inlet feed line 200b is connected to the inlet feed line 130 but the access to the first sub inlet feed line 200a is blocked.

Furthermore, the three-way return feed valve 206 is moved into a position in which the second sub return feed line 204b is connected to the return feed line 140 but access from the first sub return feed line 104a to the return feed line 140 is blocked.

In this second operational phase, the second magnetic separator unit 102b is thus in its collection phase, whereas the first magnetic separator unit 102a is carrying out the sedimentation phase and the discharge phase.

The first operational phase then starts afresh after this second operational phase whereby a new operational cycle of the second embodiment of a magnetic separator 100 begins.

This magnetic separator 100 can thus be driven without interrupting the flow of fluid through the inlet feed line 130 and the return feed line 140.

Otherwise, in regard to the construction and functioning of the second embodiment of a magnet separator 100, these correspond to those of the first embodiment, so that in these respects, reference may be made to the previous description thereof.

Figure 9:
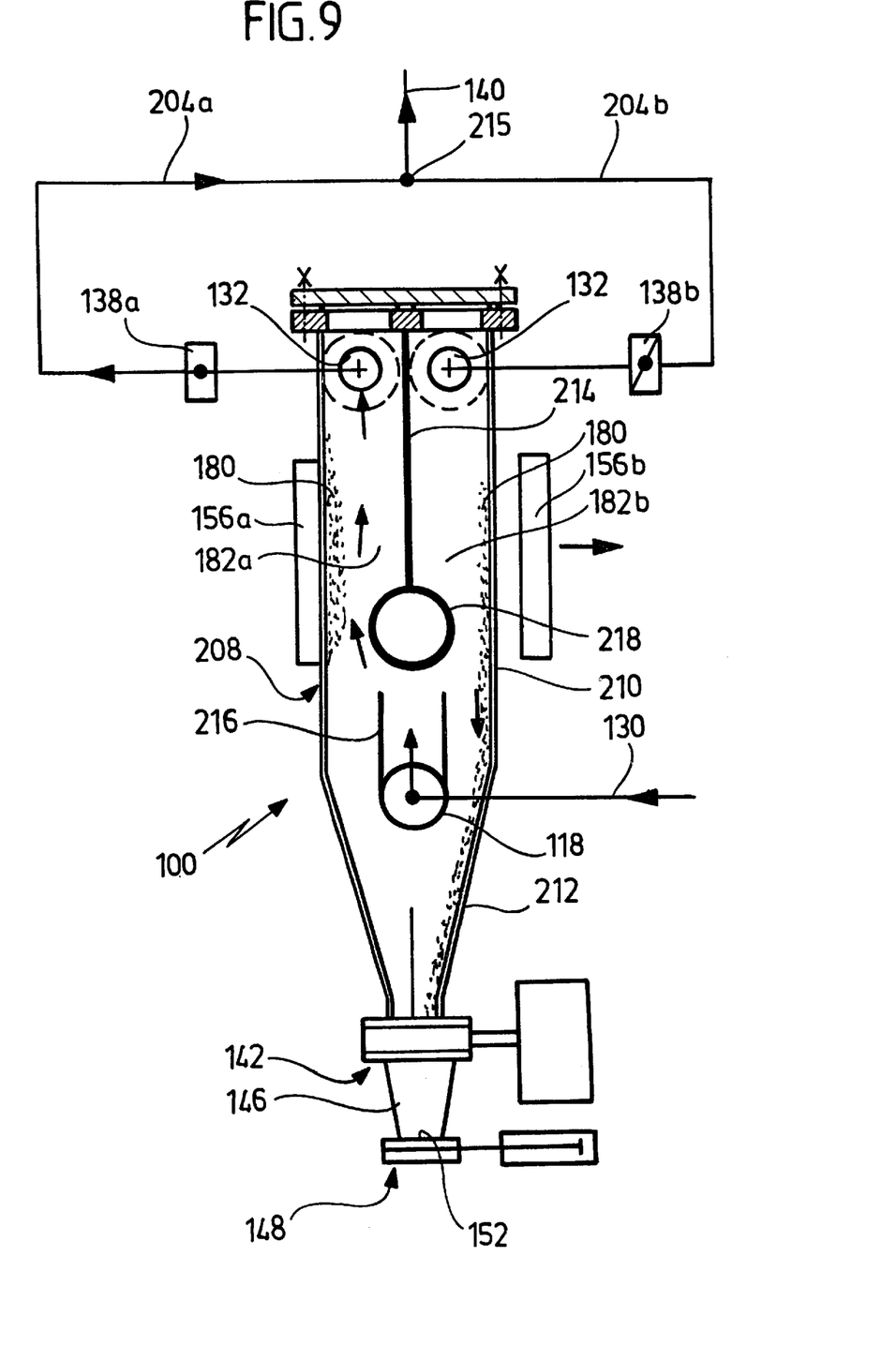
FIG. 9 a vertical longitudinal section through a third embodiment of a magnetic separator which comprises two collection chambers disposed in a common housing.

A third embodiment of a magnetic separator 100 illustrated in FIG. 9 differs from the first embodiment in that the magnetic separator 100 of the third embodiment comprises two collection chambers 182a and 182b disposed in a common housing 208.

As can be appreciated from FIG. 9, the common housing 208 comprises an upper cylindrical section 210 and a lower conical section 212 which tapers towards the lower end thereof.

A flap valve 142, a sluice chamber 146 and a slide valve 148 are arranged at this lower end as was the case in the first embodiment of the magnetic separator 100.

The two collection chambers 182a and 182b are accommodated in the upper region of the cylindrical section 210 and are separated from each other by a central partition wall 214.

A magnet unit 156a, 156b is associated with each of the collection chambers 182a, 182b, whereby the two magnet units 156a, 156b are movable independently of one another from the collection position into the removal position and back again. A return feed connection piece 132, which is connected via a first return feed valve 138a to a first sub return feed line 204a, flows into the upper region of the first collection chamber 182a.

A return feed connection piece 132, which is connected via a second return feed valve 138b to a second sub return feed line 204b, flows into the upper region of the second collection chamber 182b.

The two sub return feed lines 204a and 204b are united at a junction 215 to the return feed line 140.

An inlet feed connection piece 118, which is connected to the inlet feed line 130, flows into the upper region of the conical section 212 of the common housing 208.

The aperture opening for the inlet feed connection piece 118 into the housing 208 is shielded relative to the inner surfaces of the housing wall by means of a screening wall 216 which extends vertically upwards from said aperture opening and upon which the particles slide downwardly into the sluice chamber 146 during the sedimentation phase. This thereby prevent particles in the collector regions 180 of the collection chambers 182a, 182b from entering the inlet feed connection piece 118 during the sedimentation phase.

A guide wall 218 is arranged above the aperture opening for the inlet feed connection piece 118 and the screening walls 216, said guide wall serving to divert the fluid flowing in a vertical direction laterally into one of the collection chambers 182a or 182b in dependence on which of the return feed valves 138a, 138b happens to be open.

As can be appreciated from FIG. 9, the guide wall 218 may be in the form of the casing wall of a horizontally aligned tube having a circular cross-section for example.

The previously described third embodiment of a magnetic separator 100 functions as follows:

In a first operational phase, the first return feed valve 138a is open and the second return feed valve 138b is closed so that the fluid being cleaned flows from the inlet feed line 130 through the first collection chamber 182a and the first sub return feed line 204a into the return feed line 140 whereby the ferrite particles being carried along thereby are retained in the collector region 180 of the first collection chamber 182a by means of the magnet unit 156a which is in the collection position.

Meanwhile, the magnet unit 156b of the second collection chamber 182b is in the removal position so that the particle slurry 186 retained in the collector region 180 of the second collection chamber 182b during an earlier operational phase will sink downwardly through the open flap valve 142 into the sluice chamber 146 whose extraction opening 152 is closed by the slide valve 148.

Thus, in this first operational phase, the first collection chamber 182a is in its collection phase, whereas the second collection chamber 182b is in its sedimentation phase.

Following this first operational phase, there is a second operational phase in which the flap valve 142 is closed whereafter the particle slurry 186 collected in the sluice chamber 146 is removed through the open slide valve 148.

A third operational phase follows this second operational phase wherein the flap valve 142 is again opened, the first return feed valve 138a is closed and the second return feed valve 138b is open.

Consequently, in this third operational phase, the fluid flows out of the inlet feed line 130 through the second collection chamber 182b and the second sub return feed line 204b into the return feed line 140 whereby the ferrite particles being carried along thereby are retained in the collector region 180 of the second collection chamber 182b by the magnet unit 156b of the second collection chamber 182b which has been moved into its collection position.

By contrast, the magnet unit 156a of the first collection chamber 182a is in its removal position during the third operational phase so that the particles collected in the collector region 180 of the first collection chamber 182a in the first operational phase sediment into the sluice chamber 146 during the third operational phase.

In this third operational phase, the second collection chamber 182b is thus in its collection phase, whereas the first collection chamber 182a is in its sedimentation phase.

A fourth operational phase follows the third operational phase wherein the flap valve 142 is closed once more and the particle slurry 186 collected in the sluice chamber 146 is thereafter removed through the open slide valve 148.

The operational cycle consisting of four operational phases of the third embodiment of a magnetic separator 100 is thus completed and a new operational cycle begins with the first operational phase which has already been explained hereinabove.

Otherwise, in regard to the construction and functioning of the third embodiment of a magnetic separator 100, these correspond to those of the first embodiment, so that in these respects, reference may be made to the previous description thereof.

The present disclosure relates to the subject matter disclosed in German Application No. 100 06 262.8 of Feb. 12, 2000, the entire specification of which is incorporated herein by reference.

What is claimed is:

1. A magnetic separator for separating particles from a fluid, comprising
- a collection chamber through which the fluid is arranged to flow,
- a device for producing a magnetic field by means of which the particles are retained in a collector region of the collection chamber during a collection phase,
- a sluice chamber having a closable inlet opening through which the particles collected in the collection chamber are transferable into the sluice chamber, and also having a closable extraction opening through which the particles are removable from the sluice chamber, and
- a receptacle for an air-cushion, said receptacle communicating with the collector region of the collection chamber and containing an air-cushion that expands when the flow of fluid into the collection chamber is blocked at the end of the collection phase.

2. A magnetic separator in accordance with claim 1, wherein the sluice chamber is disposed below the collection chamber.

3. A magnetic separator in accordance with claim 1, wherein the sluice chamber tapers towards the extraction opening.

4. A magnetic separator in accordance with claim 3, wherein the sluice chamber tapers conically towards the extraction opening.

5. A magnetic separator in accordance with claim 1, wherein an inner surface of a wall of the sluice chamber is provided at least partially with an non-stick coating.

6. A magnetic separator in accordance with claim 5, wherein the inner surface of the wall of the sluice chamber is provided at least partially with an non-stick coating of polytetrafluoroethylene.

7. A magnetic separator in accordance with claim 1, wherein the inlet opening is closable by means of a pivotal flap.

8. A magnetic separator in accordance with claim 1, wherein the extraction opening is closable by means of a slider.

9. A magnetic separator in accordance with claim 1, wherein the volume of the interior of the sluice chamber substantially corresponds to the volume of particles collected in the collection chamber during the collection phase.

10. A magnetic separator in accordance with claim 1, wherein the fluid is adapted to flow from top to bottom through the collection chamber.

11. A magnetic separator in accordance with claim 1, wherein the magnetic separator comprises guide means for producing a substantially helical flow through the collection chamber.

12. A magnetic separator in accordance with claim 1, wherein the collection chamber has a substantially cylindrical shape.

13. A magnetic separator in accordance with claim 12, wherein the collection chamber has a feed inlet through which the fluid flows into the collection chamber substantially tangentially relative to an inner surface of a wall of the collection chamber.

14. A magnetic separator in accordance with claim 1, wherein the magnetic separator comprises a return feed which flows into an aperture opening in the collection chamber and extends upwardly from the aperture opening.

15. A magnetic separator in accordance with claim 14, wherein, in the vicinity of the aperture opening, a central axis of the return feed includes an angle of at least approximately 30 degrees with the horizontal.

16. A magnetic separator in accordance with claim 1, wherein the device for producing the magnetic field comprises at least one magnetic element which is movable relative to the collection chamber.

17. A magnetic separator in accordance with claim 16, wherein the magnetic element is pivotal relative to the collection chamber.

18. A magnetic separator in accordance with claim 16, wherein the magnetic element is disposed on a mounting element of ferromagnetic material.

19. A magnetic separator in accordance with claim 1, wherein the air cushion is disposed above the collector region.

20. A magnetic separator in accordance with claim 1, wherein the receptacle for the air cushion comprises a substantially cylindrical accommodating tube.

21. A magnetic separator in accordance with claim 1, wherein the magnetic separator comprises at least two collection chambers through which the fluid is arranged to flow alternately.

22. A magnetic separator in accordance with claim 1, wherein the at least two collection chambers are arranged in a common housing.

23. A magnetic separator in accordance with claim 22, wherein the common housing comprises a substantially cylindrical section.

24. A magnetic separator for separating particles from a fluid, comprising
- a collection chamber through which the fluid is arranged to flow, a device for producing a magnetic field by means of which the particles are retained in a collector region of the collection chamber during a collection phase, and a sluice chamber having a closable inlet opening through which the particles collected in the collection chamber are transferable into the sluice chamber, and also having a closable extraction opening through which the particles are removable from the sluice chamber, wherein the volume of the interior of the sluice chamber substantially corresponds to the volume of particles collected in the collection chamber during the collection phase.

* * * * *